UNITED STATES PATENT OFFICE.

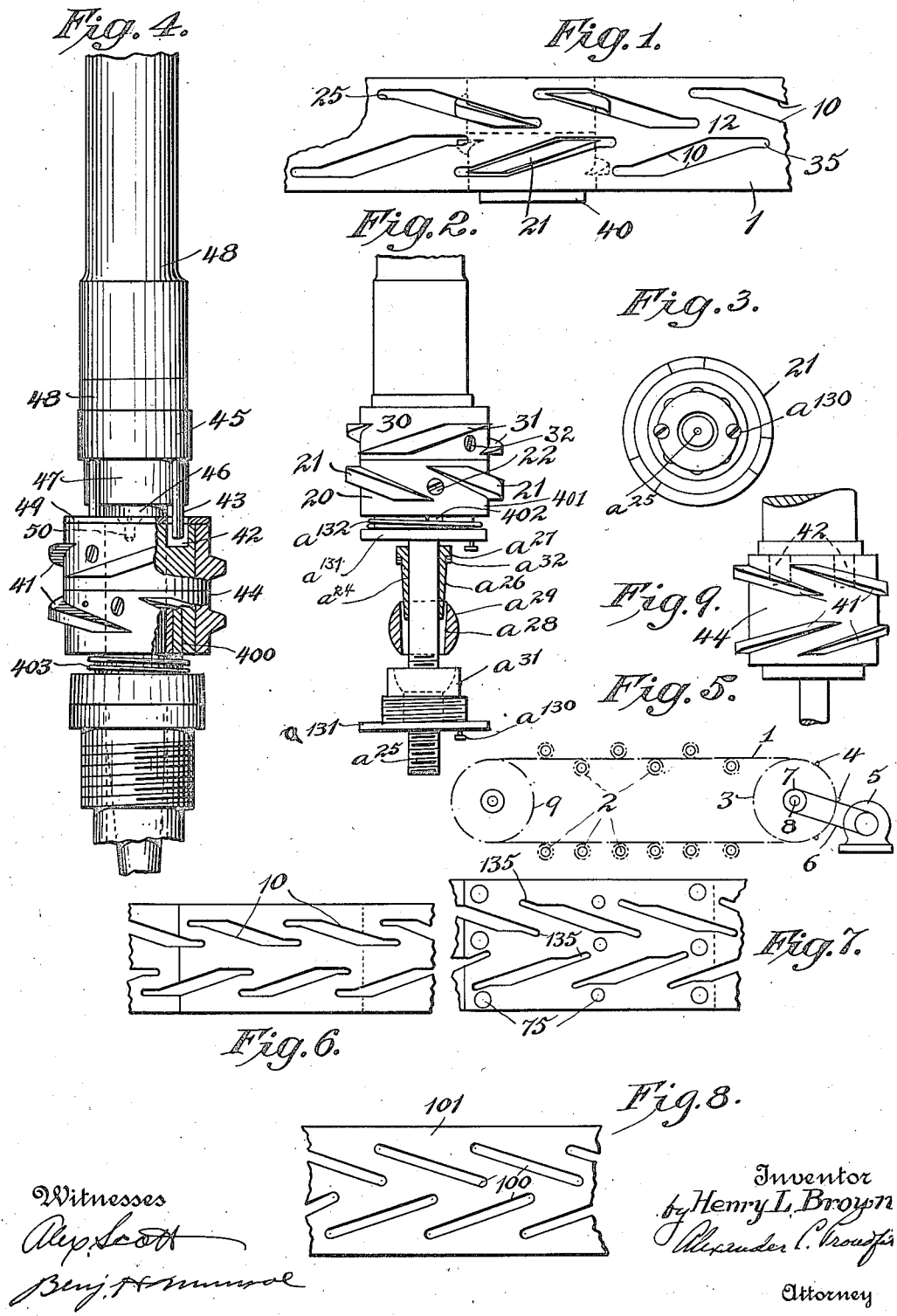

HENRY L. BROWN, OF NEW YORK, N. Y., ASSIGNOR TO BROWN SPIN-WRIGHT COMPANY, OF NEW YORK, N. Y., A CORPORATION OF NEW YORK.

POWER-TRANSMITTING MECHANISM.

1,149,625.            Specification of Letters Patent.         Patented Aug. 10, 1915.

Original application filed January 6, 1910, Serial No. 536,681. Divided and this application filed February 5, 1912. Serial No. 675,403.

*To all whom it may concern:*

Be it known that I, HENRY L. BROWN, of New York, N. Y., have invented certain Improvements in Power-Transmitting Mechanism, of which the following description, in connection with the accompanying drawings, is a specification, like characters on the drawing designating like parts.

This invention relates to power-transmitting mechanism and is of particular utility when embodied in apparatus for driving spindles, although I contemplate the use of my invention in any field for which it is adapted by the nature of my improvements, my present application having been divided from my application Serial No. 536,681, filed January 6, 1910.

An important object of my invention is to provide means for gearing a metal driving band with a gear wheel the teeth of which are constituted by relatively short portions of helical threads such as are found in the ordinary feed-screw used in lathes, since such screws can be made with a minimum of expense and a maximum accuracy owing to the proficiency of the manufacturers of such feed-screws, the excellent machinery available therefor, and the extended demand which makes the feed-screws a stable product. Accordingly, I have devised a band which may, and preferably will, be a relatively thin and flexible strip of metal, and preferably flat throughout its length to reduce to a minimum all sources of friction and accidental engagement with extraneous objects, following in this respect the preferred form of driving band disclosed in my United States Letters Patent No. 957,650, dated May 10, 1910, of which this present invention is a development.

In carrying my invention into effect, I prefer to form the rotatable member or gear wheel of my improved power-transmitting mechanism by cutting short sections of a cylindrical screw having, say, three or four circumferential peripheral threads of suitable pitch and cross-section, the lateral faces of the pinions being preferably formed so that the ends of the helical teeth are terminated by surfaces parallel with the plane of rotation of the pinion. Each pinion section, so constructed, will comprise several helical teeth bodily inclined laterally relatively to the plane of rotation, and preferably these teeth will together completely embrace the 360° of periphery, and overlap somewhat, to insure smooth continuity in operation, although I do not limit myself to the use of teeth subtending any specific circumferential arc, nor of any specific pitch, lead or number, except as found necessary for the particular installation in any given case. So also the number of pinions, or equivalent gears, and their arrangement, is immaterial, and may be varied to suit diverse contingencies, as for example in providing spindles with gears, two helical pinions may be formed on the periphery of the gear with their teeth oppositely inclined, to avoid undue thrust co-axially by reason of the inclination of the drive surfaces laterally relatively to the direction of actuative engagement of the band and helical teeth; also the separation of the teeth of the two threads by a considerable interval, and the staggered arrangement of the teeth on one pinion opposite the spaces between teeth of the other will make possible the use of a band having a substantially continuous medial web lengthwise, between the band apertures which receive the teeth, thus strengthening the band, and also promoting smoothness of operation by reason of the total absence of sharp points in the band, which is constantly being flexed as it runs around the pulleys, and might deteriorate under the bending stress at such points. These band apertures may be substantially straight, inclined bodily across the direction of movement of the band, and with parallel drive walls, and will preferably have end extensions in order to afford clearance for the ends of the helical teeth even after the drive walls of the band apertures shall have become worn by actuative engagement with the helical teeth, and this feature of my invention I regard as applicable to any form of lengthwise acting member in which it may be embodied, the separation and staggered relation of the teeth in a herringbone gear being a cognate feature of generic novelty and utility.

The various features of my invention will be illustrated and described fully in the accompanying drawings and specification and set forth in the claims.

In the drawings,—Figure 1 shows in front elevation a fragment of the driving band, in the construction of which my invention has been embodied, the same being shown in engagement with a gear; Fig. 2 is a view in side elevation of a spindle provided with a gear like that shown in Fig. 1, and having a supporting post, the parts being shown ready for assembly; Fig. 3 is a plan view, looking from bottom to top of the spindle proper illustrated in Fig. 2. Fig. 4 is a view in front elevation of the preferred form of spindle and spindle-actuating gear, in the construction of which my invention has been embodied; Fig. 5 is a plan view on a smaller scale of an endless metallic band with pulleys and motor indicated diagrammatically, and a considerable number of spindles; Figs. 6, 7 and 8 are views in elevation of modified forms of band embodying my invention, the first two of these figures illustrating different modes of joining the ends of the bands. Fig. 9 is a fragmentary view, similar to Fig. 2, showing a slightly modified form of gear upon part of a spindle.

In the embodiment of my invention selected for illustration and description to enable ready and complete understanding of my improvements, the part designated by the numeral 1 is a power transmitting member, which may be the driving or driven member in power transmitting apparatus where it is employed, and in the instance where it is illustrated may be considered as the driving band for a series of spindles, substantially as indicated on a reduced scale in Fig. 5, wherein the spindles bear respectively the numeral 2, while the numerals 3 and 4 designate respectively a suitable driving pulley, and the driving pins or teeth with which it may be provided, and 5 is an electric motor connected by a belt 6 to a pulley 7 mounted on a shaft 8 which actuates the driving pulley 3, the numeral 9 designating an idle pulley around which the other loop of the endless belt may run.

The pulleys, motor power, and other parts, may be of any suitable and convenient construction, and considerable variation may be had in the construction of the driving band, which in accordance with my invention is provided with means to be engaged positively with a rotatable member for the progressive actuation of one of said members by the other member, and as one convenient form of such means I prefer to provide the band with driving surfaces 10 inclined laterally relatively to the length of said band, and these surfaces may conveniently be formed in the manner illustrated, as the walls of apertures through the band, the latter being of any suitable material, such as a flat endless ribbon of steel, secured suitably at the joint, as by welding, brazing or riveting. Fig. 6 illustrates a brazed or welded joint, and Fig. 7 a joint with rivets 75, and other features to be described more fully hereinafter. The contour of these apertures may vary in accordance with the requirements of particular installations, and for many purposes the form illustrated in the drawings will be found most convenient, these apertures being such as to receive and coöperate with the threads of screw or spiral worm, gear or sprocket wheels such as that shown at 20, best seen in Fig. 2, the numeral 21 designating the threads or teeth of the gear, the same being shown in Fig. 1 in position engaged with the band, entering the apertures thereof and coöperating or in a position to coöperate with the walls 10 thereof. It is to be noted that the band can actuate the gear or the gear can actuate the band, and the same may be said accordingly to engage each other "co-actuatively", an expression which is used hereinafter for the sake of conciseness.

The numeral 30 designates a similar gear provided with teeth 31 of spiral form similar to those shown at 21, but of opposite angle, and arranged in staggered relation thereto, so that the end of each tooth on one of the gears comes opposite the space between two of the teeth on the other gear, the teeth 21 being preferably somewhat removed from the ends of the teeth 31, suitable means being provided to maintain the gears in this relation, and to support them in position upon the device with which they are to rotate. As a convenient form of such means I have shown a hub or sleeve 40 upon which the gears may be secured in suitable fashion, as by shrinking or forcing, or with set screws 22, 32, either or both, or as found suitable in accordance with the exigencies of particular installations.

Fig. 9 shows a very desirable form in which the two inclined sets of teeth 41 are formed integral with the hub 44. The numerals 42 designate holes to receive coupling prongs such as those shown in Fig. 4 at 43.

The band apertures are best seen in Fig. 1, where they are arranged in double lines diverging from the middle of the band, along which is preferably left a continuous web 12, for the sake of strength, and to avoid sharp points, which might be detrimental to smoothness of operation if the apertures on opposite sides were in communication at their adjacent ends. This form of band may be run in either direction, with equal facility, and may be the driving or driven member. I prefer to have the double series of apertures, oppositely inclined, but it is not essential to my invention to have such a plurality of rows of inclined surfaces 10, the double arrangement serving advantageously, however, to balance the co-axial thrust upon the band due to the inclination of the surfaces 10 engaging with the inclined surfaces of the teeth 21, and 31. The apertures will be of sufficient length to give ample clearance for entry and exit of the screw teeth 21, 31 and may be somewhat elongated as indicated at 25, 35, so that when the walls 10 become worn, the clearance will still be sufficient.

In the form of band shown in Fig. 6, extensions of the apertures are illustrated parallel with the length of the band; in Fig. 7 the extensions 135 are parallel with the axis of the aperture; and in Fig. 8 the extensions are of the same width as the working portions of the apertures 100, these apertures being somewhat narrower than those shown in Figs. 6 and 7, leaving more of the band material 101 unpunched.

The spindle shown in Fig. 2 is of a construction corresponding generally with one illustrated in my Patent No. 987,546 issued March 21, 1911, in that it has a support $a^{25}$, carrying a spherical bearing sleeve $a^{29}$ having an inwardly conical bearing surface $a^{28}$ seated upon the corresponding surface $a^{26}$ of a bushing $a^{24}$, which is provided with a shoulder $a^{27}$ and adjusting washers $a^{32}$, the spherical member being embraced between the hub 401 of the spindle and a member $a^{31}$ arranged to screw within the hub and to be secured there by a set screw $a^{130}$.

A collar $a^{131}$ serves to hold in place a spring $a^{132}$ upon which is seated the gear 20, the latter being free to move axially along the hub 401, but being secured to rotate therewith by suitable means such as a screw 22 entering a groove 402 in the hub, the gear being thus free to move vertically under the influence of the driving band. Normally the parts $a^{24}$, $a^{29}$ and $a^{31}$ are inclosed within the part 401 as indicated at the upper part of Fig. 2, where the collar $a^{131}$ appears in its normal position.

In Fig. 4 the gear 44 is held by a similar spring 403 surrounding a bushing 400 upon which the gear rotates, the gear being made up of a sleeve with annuli seated thereon provided with driving teeth 41. The teeth may be hardened, and the sleeve of cast metal provided with apertures 42 to receive driving prongs 43 carried by a collar 45 which has a frictional fit upon the spindle blade 46, being held in place against axial movement by collars 47, 48 fast upon the spindle blade. The numeral 49 designates a wear-plate secured to the gear by a screw 50.

Normally, under the action of the gear 44, communicated by the prongs 43, the collar 45 rotates the spindle blade 46, and with it the bobbin 48, but if, in doffing the bobbin, the operator grasps the latter in such a way as to stop rotation of the spindle blade 46, the gear 44 can still rotate the collar 45, which slips upon the spindle blade. When released, the friction of the collar upon the contiguous parts is sufficient to start the spindle.

Having illustrated and described my invention thus fully and suitable means by which the same may be carried into effect, I wish it to be understood that I do not limit myself to the specific structural forms and materials selected for illustration and description, nor in general otherwise than as set forth in the claims read in connection with this specification, and attention is further called to the fact that certain portions of the subject matter illustrated herein by way of example is not claimed specifically herein, for the reason that it forms the subject of claims in my above-mentioned co-pending application Serial No. 536,681, and of my co-pending application Serial No. 594,960, filed November 30, 1910, the latter application and my present application having been divided from my aforesaid application Ser. No. 536,681.

What I claim as new and desire to secure by United States Letters Patent is:

1. Power-transmitting-mechanism; comprising a gear having helical teeth; and a band with apertures to receive said helical teeth, the aperture walls intermeshing co-actuatively therewith; substantially as described.

2. Power-transmitting-mechanism of the class described; comprising a rotatable member having a plurality of parallel series of helical, peripheral actuating projections, differently inclined, projections of similar inclination being arranged in a series separated from other projections of different inclination, and staggered relatively thereto; and a band with apertures having driving walls geared co-actuatively with said projections; substantially as described.

3. Power-transmitting-mechanism of the class described; comprising a rotatable member having a plurality of parallel series of helical, peripheral actuating projections, differently inclined, projections of similar inclination being arranged in a series separated from other projections of different inclination, and staggered relatively thereto; and a band geared co-actuatively with said projections; said band having apertures in series corresponding to, and to receive, said projections, with a substantially continuous band portion between said series of apertures.

4. Power-transmitting-mechanism of the class described comprising a rotatable member having peripheral actuating teeth arranged in herringbone pattern; and a band having apertures in herringbone pattern with driving walls geared in co-actuative engagement with said teeth, substantially as described.

5. Power-transmitting-mechanism of the class described; comprising a rotatable member with helical, peripheral teeth arranged in herringbone pattern; teeth of similar inclination being separated from teeth of different inclination and staggered with relation thereto; and a band geared co-actuatively with said teeth; said band having teeth-receiving apertures with inclined drive-walls so located as to be engaged continuously with portions of two of said teeth in one series and at least one tooth in another series, when in operative position.

6. Power-transmitting-mechanism of the class described; comprising a rotatable member with helical, peripheral teeth arranged in herringbone pattern, teeth of similar inclination being separated from teeth of different inclination and staggered with relation thereto; and a band having apertures in herring-bone pattern with driving walls geared co-actuatively with said teeth, substantially tangent to said rotatable member.

7. A band for power-transmitting-mechanism of the class described; said band having longitudinally inclined apertures, substantially as described.

8. A band for power-transmitting-mechanism of the class described; said band having longitudinally inclined apertures with substantially parallel driving walls, substantially as described.

9. A band for power-transmitting-mechanism of the class described; said band having oppositely inclined drive apertures arranged in a plurality of series, according to inclination, substantially as described.

10. A band for power-transmitting-mechanism of the class described; said band having oppositely inclined drive apertures arranged in a plurality of series, according to inclination; and said band having a substantially continuous medial portion separating said series.

11. A band for power-transmitting-mechanism of the class described; said band having oppositely inclined drive apertures arranged in a plurality of series, according to inclination; and said band having a substantially continuous medial portion separating said series; the apertures in one series being staggered relatively to those in another series.

12. A band for power-transmitting apparatus of the class described; said band having elongated, substantially straight apertures arranged in parallel series so located that the body of any given aperture is opposite the adjacent ends of two apertures in another series; substantially as described.

13. A band for power-transmitting-mechanism of the class described; said band having a longitudinally inclined drive aperture, one end of said aperture being extended to furnish clearance for the drive member to be received therewithin as the wall of said aperture wears away under driving engagement with said member.

14. A band for power-transmitting mechanism of the class described; said band having a longitudinally inclined drive aperture, one end of said aperture being extended in parallelism with the length of said band to furnish clearance for the drive member to be received therewithin, as the wall of said aperture wears away under driving engagement with said member.

15. Power-transmitting-mechanism of the class described; said mechanism comprising a lengthwise moving member having a plurality of drive apertures to receive recurrently the helical peripheral drive teeth of a coöperating rotating member, for actuation of one of said members by the other, and a rotating member having teeth terminating at each end in surfaces parallel with the plane of rotation of said driving member, said apertures having a bodily angular inclination to said plane corresponding to the helical pitch of said teeth, with enlargements at the ends of said apertures, to furnish clearance for said teeth ends.

16. Power-transmitting-mechanism comprising a lengthwise moving member having a plurality of drive apertures to receive recurrently the helical peripheral drive teeth of a coöperating rotating member, for actuation of one of said members by the other, and a rotating member having helical, peripheral drive teeth, said teeth terminating at each end in surfaces parallel with the plane of rotation of said driving member, and said apertures having a bodily angular inclination to said plane corresponding to the helical pitch of said teeth, with enlargement at the ends of said apertures extending in the line of movement of said lengthwise moving member, to furnish clearance for said teeth ends, normally and after wear of the walls of said apertures by operative engagement with said teeth.

17. A metal power-transmitting band, flat throughout its length, and having apertures arranged divergently in plural series with longitudinally inclined drive walls confined between the faces of said band, substantially as described.

18. The combination with a spindle; of a rotatable member having helical teeth of opposed inclination; means to support said spindle and member co-axially; a band provided with apertures to receive said teeth and the walls of said apertures being constructed and arranged to engage said teeth to rotate said member; and means to connect said member with said spindle to rotate the latter.

19. Power-transmitting-apparatus; comprising an elongated, metallic band having closely arranged apertures; means to drive said band at high speed, and a multiplicity of rotatable members of relatively small diameter having respectively peripheral teeth to enter said band apertures and to be engaged actuatively with said band, and springs on which said gears are respectively mounted to float so that said gears can follow the movements of said band parallel to the axis of said gears; substantially as described.

20. Power-transmitting-apparatus; comprising a metallic band having apertures arranged closely in staggered relation in a plurality of lines lengthwise of said band; and a multiplicity of rotatable members of relatively small diameter, with peripheral projections in close proximity for continuous actuative engagement with said band, entering the apertures thereof, several at a time on each gear at the points where said band is in tangent relation therewith, said band being arranged to run in tangency to all of said gears; substantially as described.

Signed at New York in the county and State of New York this 3rd day of February, 1912.

HENRY L. BROWN.

Witnesses:
WM. E. HOLLAND,
ALEXANDER C. PROUDFIT.